United States Patent Office 3,316,207
Patented Apr. 25, 1967

3,316,207
STABILIZED COPOLYMERS OF TRIOXANE
Hans Dieter Hermann and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 26, 1963, Ser. No. 276,062
Claims priority, application Germany, Apr. 28, 1962, F 36,665
2 Claims. (Cl. 260—45.8)

The present invention relates to a process for stabilizing copolymers of trioxane.

Polyoxymethylenes of high molecular weight that are unaffected by temperature changes have recently become industrially very important. They can be used very well for the manufacture of shaped articles by injection molding or extrusion processes. Shaped articles of this kind are in particular distinguished by their hardness, strength and toughness. The two most important methods for the preparation of polyoxymethylenes are the anionic polymerization of formaldehyde and the cationic polymerization of trioxane. The polyoxymethylenes which have thus been prepared contain terminal hydroxy groups and consequently have the structure of hemiacetals. When exposed to the action of heat the hemiacetals decompose with the formation of monomeric formaldehyde. The decomposition may take place by a so-called unzipping reaction and may lead to the complete depolymerization of the polymer into monomeric formaldehyde.

Polyoxymethylenes which are to be exposed to the action of heat must consequently not contain terminal hemiacetal groups. Various methods are known to block the chain ends of the polymers. All these methods are, however, more or less expensive. The best known process is the acetylation of the terminal hydroxy groups with acetic anhydride. After the reaction the excess of acetic anhydride and the acetic acid which has formed must be carefully eliminated from the polymer. The polyoxymethylene acetate thus obtained is rather stable against the action of heat but it is sensitive to acids and to alkalis.

Methods for etherifying the terminal groups are complicated, in part lead to poor yields and yield products of a reduced molecular weight.

It is much more simple to prepare copolymers of trioxane containing stable terminal groups. By an appropriate choice of the comonomers the depolymerization of the polymer which starts from the ends of the chains can be stopped at the comonomer units. Consequently, the only requirement to be fulfilled if a stable copolymer is to be prepared is to subject the polymer to an after-treatment carried out at an elevated temperature or in the presence of an alkali. Copolymers of trioxane that are particularly suitable are those containing oxyalkyl groups having at least two neighboring carbon atoms in the chain. They can be prepared in a very simple manner, for example by copolymerizing trioxane with cyclic ethers or formals.

Both the copolymers and the homopolymers of trioxane have to be stabilized against thermal degradation and oxidation. However, the stabilizers which can be used for stabilizing homopolymers are not equally suitable for stabilizing copolymers. In many cases stabilizers for homopolymers are little or not at all suitable for copolymers and even more frequently substances that are suitable for stabilizing copolymers are not or little suitable for stabilizing homopolymers. It is especially remarkable that in the stabilization of copolymers, stabilizer combinations have a strong synergistic effect. It is therefore important to use stabilizer combinations, the individual components of which are compatible with one another, and it is particularly advantageous in this case to use one component that stabilizes predominantly against thermal degradation and another component that stabilizes predominantly against oxidation. It has been known to use urea compounds as stabilizers for homopolymers of formaldehyde. In the stabilization of homopolymers they are, however, clearly excelled in their effect by polyamides and amides of polybasic carboxylic acids. It has been proposed to stabilize copolymers of trioxane by means of amidines. Their efficiency is, however, often not sufficient. Besides, they tend to cross-link the polymer.

Now we have found that (a) derivatives of ethylene imine,
(b) urea compounds containing the grouping
    —O—CO—CH$_2$—CH$_2$—CH$_2$NHCONH$_2$,
(c) urea compounds containing the grouping

(d) sulfur-containing polyamides,
(e) polyacrolein oxime,
(f) triphenyl methyl lower alkyl ether,
(g) indoles containing amino groups,
(h) indazoles containing amino groups,
(i) amides of fumaric acid, cyanaectic acid and amides of indene carboxylic acids are particularly suitable for stabilizing copolymers of trioxane containing oxyalkyl groups having at least two adjacent carbon atoms in the chief valence chain. The efficiency of the aforesaid compounds can in many cases be increased by applying them for the stabilization in combination with known phenols and/or known aromatic amines. In the stabilization of copolymers of trioxane the aforesaid stabilizers and stabilizer systems clearly excel other stabilizers, for example polyamides that are free from sulfur, thiourea derivatives and amides of polybasic carboxylic acids with the exception of fumaric acid amide and amidines.

Suitable stabilizers are, for example, (a) ethylene imines of aliphatic or aromatic carboxylic acids, derivatives of N,N-ethylene urea, N-stearyl-N', N'-ethylene urea, hexamethylene-1.6-bis-ethylene urea and others, (b) esters of γ-ureidobutyric acid and alcohols, preferably polyhydric aliphatic or aliphatoaromatic alcohols,
(c) aliphatic and, in particular, aromatic compounds which are substituted by the radical

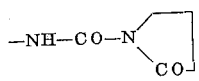

(d) polyamides which in their chain contain sulfur-containing diols or dicarboxylic acids, in particular polyamides of thiodiacetic acid and thiopropionic acid,
(e) polyacroleins which have completely or partially been reacted with hydroxyl amine,
(f) methyl, ethyl or propyl ether of triphenyl carbinol,
(g) amine-substituted indoles such as N-stearyl-N-methyl-N-3-indolylmethyl amine or 3-(dimethyl aminomethyl)-indole,
(h) amine-substituted indazoles, for example 5-amino-3-acetyl aminoindazole,
(i) fumaric acid diamide, cyanacetamide, indene-2-carboxylic acid amide.

The aforesaid stabilizers can be used alone. In many cases the optimum stabilizing effect is obtained, however, when they are used together with phenols and/or aromatic amines. Suitable phenols are in particular those that are substituted in o- or p-position with respect to the phenolic group, for example 2.6-dimethyl-4-tert. butyl phenol. Bisphenols, for example 2,2'-methylene-bis-(4-methyl-6-tert. butyl phenol), or polyphenols, for example the condensation product obtained from 4-tert. butyl phenol and formaldehyde, are particularly suitable.

As aromatic amines which have a good stabilizing effect may be mentioned inter alia, in particular, the derivatives of diphenyl amine, for example 4.4'-dioctyl diphenyl amine. Aromatic amines which are substituted not only by the amino group but also by phenol groups, amide groups or urea groups are also very suitable.

The above-mentioned stabilizers and stabilizer systems enable a stability to heat and oxygen to be imparted to copolymers of trioxane which up to now it has not been possible to attain. Moreover, the said stabilizers and stabilizer systems can very easily be applied. In most cases it is sufficient to apply them by simple mechanical mixing. They can also be applied to the polymer in any other desired way.

The concentration of stabilizer which is necessary to increase the stability to heat of the high molecular weight copolymer depends on the efficiency of the stabilizer and on the nature and quality of the copolymer to be stabilized. It may consequently vary within wide limits. Each stabilizer and each component of the stabilizer systems may be used in concentrations within the range of 0.01 to 10% by weight, calculated on the polymer, and is advantageously used in a concentration within the range of 0.05 to 5% by weight, calculated on the polymer.

In order to test the stability of the copolymers of trioxane to which a stabilizer may have been added, the loss in weight of a specimen heated for a certain period at a temperature above 200° C., for example for 30 minutes at 220° C., is measured. This test can be carried out in an inert atmosphere, for example under nitrogen, or in air. A useful stabilizer system has to yield good values under the most various conditions.

By copolymers of trioxane are here to be understood those which in the chief valence chain contain oxy-alkyl groups having at least two neighboring carbon atoms i.e., groups of the formula

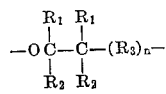

in which $R_1$ and $R_2$ are hydrogen or lower alkyl, $R_3$ is methylene, lower alkyl-substituted methylene or lower alkyl-substituted oxymethylene and $n$ is an integer from zero to two. The concentration of oxyalkyl groups may amount to 0.1 to 50% by weight of the total polymer. It is not absolutely necessary that the copolymers possess stable terminal groups. Terminal hemiacetal groups can be removed from the polymer even after the stabilizer or stabilizer system has been incorporated, for example by kneading the polymer under reduced pressure at a temperature within the range of 180° to 220° C. Often it is preferred, however, to use for the stabilization a polymer having stable terminal groups. Polymers having a reduced viscosity of more than 0.2 (determined in a solution of 0.5% strength in butyrolactone at 140° C. in the presence of 2% of diphenyl amine), preferably those which have a reduced viscosity within the range 0.5 to 2 may be stabilized in accordance with this invention. Although in principle all trioxane copolymers within the above-mentioned limits can be stabilized, it is desirable to use polymers which already possess a certain minimum stability before they are stabilized, for example polymers which when heated for 30 minutes at 220° C. lose no more than 80% of their weight.

The trioxane copolymers of high molecular weight can easily be prepared by cationic polymerization of trioxane which is preferably carried out in the presence of boron trifluoride or its complex compounds. Comonomers which are particularly suitable for the preparation of the copolymers include ethylene oxide and its derivatives, oxetanes and cyclic formals, for example those of glycol, 1.3-butane diol, 1.4-butane diol, diethylene glycol or 1.4-butene diol (2). In some cases it may be desirable to incorporate additional stabilizers with the polymer, for example amides of polybasic carboxylic acids, polyamides or compounds of bivalent sulfur. In any case it is advantageous to use a light stabilizer, for example an α-oxybenzophenone, in addition to the other stabilizers.

The stabilizers or stabilizer systems can be incorporated with the polymer in any desired manner. Methods by which the stabilizers can be uniformly distributed in the polymer in a finely dispersed form are particularly suitable. The finely ground stabilizers can, for example, be introduced into the high molecular weight copolymer in a dry mixer, or on a roller mill. Alternatively, the stabilizers can be dissolved in a solvent such as methanol or acetone, the polymer is suspended in the resulting solution and finally the batch is evaporated to dryness. In certain cases it is particularly advantageous to incorporate the stabilizer system with the polymer melt. In this case unstable portions of polymer may, if desired, be removed.

The copolymers of trioxane of high molecular weight which have been stabilized by the process according to the invention, in particular those having stable terminal groups, can be used for the preparation of filaments, sheets and films, tubes, profiles and injection-molded articles.

The following example serves to illustrate the invention but it is not intended to limit it thereto.

*Example*

In each case, 10 grams of a finely ground copolymer of trioxane and 2% by weight of ethylene oxide which was free from unstable portions were intimately mixed with one of the compounds indicated in the table given below. Each of the stabilized samples was heated for 90 minutes at 220° C. under nitrogen and for 45 minutes at 230° C. in air. The loss in weight of the samples is indicated in the table. The results of this test show that the compounds according to the invention excel various other stabilizers. In the table the stabilizers are arranged in classes according to the classification made above.

TABLE

| Stabilizer 1 | Content of the stabilizer in the polymer in percent by weight | Stabilizer 2 | Content of the stabilizer in the polymer in percent by weight | Loss in weight in percent of the samples after— | |
|---|---|---|---|---|---|
| | | | | 90' at 220° C. under N₂ | 45' at 230° C. in air |
| Class (a)—Ethylene imine derivatives: | | | | | |
| Dioctyl diphenylamine | 1 | | | 15.0 | 20.5 |
| Do | 1 | N,N'-bis-3-ethylene iminopropyl oxalic acid diamide | 1 | 3.5 | 2.5 |
| Do | 1 | | | 1.5 | 0.8 |
| Do | 1 | N-stearyl-N',N'-ethylene urea | 1 | 1.4 | 1.1 |
| 2,2'-methylene-bis-(4-methyl-6-t. butylphenol) | 1 | Hexamethylene 1.6-bis-ethylene urea | 1 | 0.9 | 1.0 |
| Do | 1 | | | 6.2 | 2.3 |
| Do | 1 | N,N'-bis-3-ethylene iminopropyl oxalic acid diamide | 1 | 1.5 | 1.3 |
| Do | 1 | N-stearyl-N',N'-ethylene urea | 1 | 1.9 | 1.1 |
| Do | 1 | Hexamethylene-1.6-bis-ethylene urea | 1 | 1.6 | 1.7 |
| Class (b)—Esters of γ-ureidobutyric acid: | | | | | |
| Dioctyl diphenylamine | 1 | γ-ureidobutyric acid ester of phenoxyethanol | 1 | 0.9 | 1.4 |
| Condensation product of isobornyl phenol plus CH₂O | 1 | | | 3.4 | 2.5 |
| Class (c)—Compounds containing the grouping: −NH−CO−N(CO−)(CO−) (designated below as R). | | | | | |
| Dioctyl diphenylamine 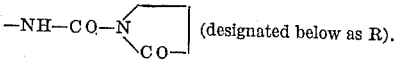 | 1 | | 1 | 2.1 | 1.8 |
| Do 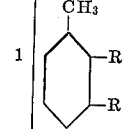 | 1 | | 1 | 2.5 | 2.0 |
| Class (d)—Sulfur-containing polyamides: dioctyl diphenylamine | 1 | Copolyamide of hexamethylene diamine thiodiglycolic acid, ε-aminocarproic acid, adipic acid hexamethylene diamine (1:1:1) | 1 | 1.7 | 1.3 |
| Class (e)—Polyacroleinoxime: Dioctyl diphenylamine | 1 | Polyacrolein oxime | 1 | 1.3 | 1.4 |
| Class (f)—Triphenyl methylether: Dioctyl diphenylamine | 1 | Triphenyl methyl methylether | 1 | 2.0 | 2.1 |
| Class (g)—Indoles containing amino groups: Di-octyl diphenylamine | 1 | N-stearyl-N-methyl-N-3-indolylmethylamine | 1 | 1.9 | 1.3 |
| Class (h)—Indazoles containing amino groups: | | | | | |
| Dioctyl diphenylamine | 1 | 5-amino-3-acetylamino-indazole | 1 | 1.3 | 1.0 |
| 2,2'-methylene-bis(4-methyl-6 t. butylphenol) | 1 | do | 1 | 1.4 | 1.7 |
| Condensation product of isobornylphenol plus CH₂O | 1 | do | 1 | 0.8 | 1.2 |
| Class (i)—Amides of cyanacetic acid, fumaric acid and indene carboxylic acid: | | | | | |
| Dioctyl diphenylamine | 1 | Indene-2-carboxylic amide | 1 | 1.3 | 2.0 |
| Do | 1 | Cyanacetic acid amide | 1 | 2.5 | 2.0 |
| Do | 1 | Fumaric acid diamide | 1 | 0.8 | 0.8 |
| Indene-2-carboxylic amide | 1 | do | 1 | 1.1 | 1.2 |
| | | do | 1 | 4.5 | 3.0 |
| 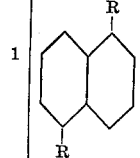 | 1 | do | 1 | 1.2 | 1.2 |
| 1-(p-aminophenyl)imidazolidone | 1 | do | 1 | 0.5 | 0.5 |
| 3-dimethyl aminomethylindole | 1 | do | 1 | 1.8 | 1.4 |
| 5-amino-3-acetyl aminoindazole | 1 | do | 1 | 2.0 | 1.2 |
| Condensation product of p-octylphenol plus CH₂O | 1 | do | 1 | 2.1 | 1.0 |
| Stabilizers not claimed: | | | | | |
| 2,2'-methylene-bis-(4-methyl-6-t. butylphenol) | 1 | N,N'-diphenyl urea | 1 | 3.5 | 2.1 |
| Do | 1 | Urea | 1 | 5.1 | 2.2 |
| Do | 1 | Malonic acid diamide | 1 | 4.1 | 2.1 |
| Do | 1 | Melamine | 1 | 3.1 | 1.9 |

We claim:

1. A stabilized copolymer of trioxane with ethylene oxide, ethylene glycol, 1,3-butane diol, 1,4-butane diol, diethylene glycol or 1,4-butene diol-2 containing within the range of 0.01 to 10% by weight of a member selected from the group consisting of (a) N,N'-bis-3-ethylene imino-propyl oxalic acid diamide,
(b) N-stearyl-N',N'-ethylene urea,
(c) hexamethylene-1,6-bis-ethylene urea,
(d) γ-ureidobutyric acid ester of phenoxyethanol,
(e) 2,3-di(butyrolactamureido) toluene, (f) 1,5-di(butyrolactamureido) naphthalene,
(g) copolyamide of hexamethylene diamine thioglycolic acid, epsilon-aminocaprioc acid and adipic acid hexamethylene diamine,
(h) polyacrolein oxime,
(i) N-stearyl-N-methyl-N-3-indolylmethyl amine,
(j) 5-amino-3-acetylamino-indazole,
(k) indene-2-carboxylic acid amide and
(l) cyanacetic acid amide.

2. A composition as defined in claim 1 containing, in addition, 0.01 to 10% by weight dioctyl diphenylamine or 2,2'-methylene-bis-(4-methyl-6-tert. butylphenol).

References Cited by the Examiner
UNITED STATES PATENTS

| | | | |
|---|---|---|---|
| 2,871,220 | 1/1959 | MacDonald | 260—45.95 |
| 2,993,025 | 7/1961 | Alsup et al. | 260—45.9 X |
| 3,131,165 | 4/1964 | Hermann et al. | 260—45.9 |
| 3,156,669 | 10/1964 | Kray et al. | 260—45.9 X |
| 3,240,748 | 3/1966 | Schmidt et al. | 260—45.8 |

LEON J. BERCOVITZ, *Primary Examiner.*

DONALD E. CZAJA, *Examiner.*

M. J. WELSH, *Assistant Examiner.*